(12) United States Patent
Bailey et al.

(10) Patent No.: US 8,645,654 B1
(45) Date of Patent: Feb. 4, 2014

(54) SELECTING PHYSICAL STORAGE IN DATA STORAGE SYSTEMS

(75) Inventors: Charles Christopher Bailey, Cary, NC (US); Dayanand Suldhal, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 185 days.

(21) Appl. No.: 13/172,517

(22) Filed: Jun. 29, 2011

(51) Int. Cl.
*G06F 12/00* (2006.01)

(52) U.S. Cl.
USPC .................. 711/165; 711/170; 711/E12.002

(58) Field of Classification Search
None
See application file for complete search history.

(56) References Cited

U.S. PATENT DOCUMENTS

| | | | |
|---|---|---|---|
| 7,181,578 B1* | 2/2007 | Guha et al. | 711/154 |
| 2006/0010169 A1* | 1/2006 | Kitamura | 707/200 |

* cited by examiner

*Primary Examiner* — Reginald Bragdon
*Assistant Examiner* — Thanh D Vo
(74) *Attorney, Agent, or Firm* — Krishnendu Gupta; Jason A. Reyes; Deepika Bhayana (57) ABSTRACT

A method is used in selecting physical storage in data storage systems. A request for allocation of a portion of storage area of a data storage system is received from a requesting entity. The data storage system is comprised of a set of storage entities and a set of data buses for transferring data to and from the set of storage entities. The set of storage entities are organized into a set of logical units. Each logical unit of the set of logical units is subdivided into a set of slices. A slice is selected from a logical unit of the set of logical units for allocation for use by the requesting entity in response to receiving the request for allocation. The selection is based on an optimum value indicating physical location of the logical unit within the set of storage entities during access to data to be stored in the data storage system.

16 Claims, 7 Drawing Sheets

SELECTING PHYSICAL STORAGE IN DATA STORAGE SYSTEMS

BACKGROUND

1. Technical Field

This application relates to selecting physical storage in data storage systems.

2. Description of Related Art

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling both requests for allocation and input/output (I/O) requests. An SP is the controller for and primary interface to the storage array.

Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

A hard disk drive (also referred to as "disk") is typically a device including a magnetic head (also referred to as "head"), a disk arm, a motor, and one or more platters that store information. The motor turns a platter underneath the magnetic head. The platter contains electrically encoded data that is detected by the magnetic head as the head passes over the platter. The platter can be read from or written to and is generally used to store data that will be accessed by the storage array. Typically, data is arranged in concentric circles on the platter, which are divided into the minimum storage unit of sectors. The magnetic head is moved along a radius of the platter, and the magnetic head reader/writer accesses particular locations within the platter as the platter spins under the magnetic head. Therefore, a disk access time consists of a seek time (to move the head over a track), a rotational delay (to rotate the sector under a head), and a transfer time (to access the requested data).

A seek time of a disk is the time required by the disk to find the required data on the disk. A seek time may include a head seek time, which is the time required by the magnetic head of the disk to move and position the head over the destination track on the platter of the disk for reading data from the destination track. The head seek time of a disk increases as the distance traveled by the magnetic head of the disk increases. An arm swing of a disk is the physical movement the disk must do in order to locate requested data.

Those skilled in the art are familiar with the read and write operations of hard disk drives. In a typical practical implementation, a disk drive may consist of circuit board logic and a Head and Disc Assembly (HDA). The HDA portion of the disk drive includes the spindles platters, disk arm and motor that make up the mechanical portion of the disk drive.

Performance of a storage array may be characterized by the array's total capacity, response time, and throughput. The capacity of a storage array is the maximum total amount of data that can be stored on the array. The response time of an array is the amount of time that it takes to read data from or write data to the array. The throughput of an array is a measure of the amount of data that can be transferred into or out of (i.e., written to or read from) the array over a given period of time.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

One factor that may limit the performance of a storage array is the performance of each individual storage component. For example, the read access time of a disk storage array is constrained by the access time of the disk drive from which the data is being read. Read access time may be affected by physical characteristics of the disk drive, such as the number of revolutions per minute of the spindle: the faster the spin, the less time it takes for the sector being read to come around to the read/write head. The placement of the data on the platter also affects access time, because it takes time for the arm to move to, detect, and properly orient itself over the proper track (or cylinder, for multihead/multiplatter drives). Reducing the read/write arm swing reduces the access time. Finally, the type of drive interface may have a significant impact on overall disk array storage. For example, a multihead drive that supports reads or writes on all heads in parallel will have a much greater throughput than a multihead drive that allows only one head at a time to read or write data.

Furthermore, even if a disk storage array uses the fastest disks available, the performance of the array may be unnecessarily limited if only one of those disks may be accessed at a time. In other words, performance of a storage array, whether it is an array of disks, tapes, flash drives, or other storage entities, may also be limited by system constraints, such the number of data transfer buses available in the system and the density of traffic on each bus.

Large storage arrays today manage many disks that are not identical. Storage arrays use different types of disks and group the like kinds of disks into tiers based on the performance characteristics of the disks. A group of fast but small disks may be a fast tier (also referred to as "higher tier"). A group of slow but large disks may be a slow tier (also referred to as "lower tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different RAID levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system.

A RAID system is an array of multiple disk drives which appears as a single drive to a data storage system. A goal of a RAID system is to spread, or stripe, a piece of data uniformly across disks (typically in units called chunks), so that a large request can be served by multiple disks in parallel. A RAID system reduces the time to transfer data, while the disk in a RAID that incurs the longest seek and rotation delays can slow down the completion of a striped request.

SUMMARY OF THE INVENTION

A method is used in selecting physical storage in data storage systems. A request for allocation of a portion of storage area of a data storage system is received from a requesting entity. The data storage system is comprised of a set of storage entities and a set of data buses for transferring data to and from the set of storage entities. The set of storage entities are organized into a set of logical units. Each logical unit of the set of logical units is subdivided into a set of slices. A slice is selected from a logical unit of the set of logical units for allocation for use by the requesting entity in response to receiving the request for allocation. The selection is based on an optimum value indicating physical location of the logical unit within the set of storage entities during access to data to be stored in the data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in selecting physical storage in data storage systems, which technique may be used to provide, among other things, selecting a slice from a logical unit of a set of logical units for use by a requesting entity in response to receiving a request for allocation, where the selection of the slice is based on an optimum value indicating physical location of the logical unit within a set of storage entities of a data storage system.

A storage pool may be a collection of disks, which may include disks of different types. Storage pools may further be subdivided into slices; for example a 1 GB slice may be the allocation element for a logical unit. As well, a pool may be used synonymously with a storage tier. That is, both a storage tier and a pool may have storage devices of different performance capabilities and costs. As well, both may contain slices (also referred to as "data slices"). A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

Further, a data storage system may also include one or more thin devices (also referred to as "mapped LUN" or "thin LUN"). A thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices such as device volumes and RAID groups, which are logical devices that map logical storage space of the data device to physical storage space on physical devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping on the location of the physical drive where it starts and ends; a slice may be sliced again.

Slices are allocated to LUNs in a storage pool as "best-fit" at initial allocation time. In at least some cases, since the I/O load pattern of a slice is not known at initial allocation time, conventionally the performance capability of slice storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier.

Slice relocation (herein also referred to as a "data relocation" or "data migration") is a process of determining optimal or near optimal data placement among storage objects (e.g., storage tier, RAID group) based on I/O load of the storage objects. Slice relocation helps provide a way to determine respective preferable or best storage locations of data slices within a LUN in a storage pool, and to construct a slice relocation candidate list to move slices from their current locations to the respective preferable or best locations. Data migration, i.e., the moving of data from one storage element to another, may be performed at the LUN level or at the slice level. Data migration at the slice level may be performed by copying the data of a slice and then updating an address map of the slice with the new location of the slice.

Conventionally, a logical unit is selected from a set of logical units in a RAID group for allocating a slice for writing data to the slice in a data storage system. In such a conventional system, the physical location of a logical unit is not taken into consideration when selecting the logical unit from a set of logical units in a RAID group. Thus, in such a conventional system, for example, a first logical unit may be selecting in a RAID group for allocating a first slice and a second logical unit may be selected for allocating a second slice in such a way that the first and second logical units may be physically located at opposite ends in the RAID group. As a result, conventionally in such a system, a disk of the RAID group may need to move a magnetic head of the disk from one end of the RAID group to another end of the RAID group in order to write data to the first and second slices of the first and second logical units respectively. Thus, in such a conventional system, the seek time of the disk increases as the head of the disk drive moves from one end of the RAID group to another end of the RAID group resulting in degradation of I/O performance. Furthermore, in such a conventional system, even if the disk storage array uses the fastest disks available, the performance of the array may be unnecessarily limited due to excessive movement of the magnetic head of the disk of the RAID group when logical units that are not located closer to each other are selected for allocating storage for performing I/O operations.

Further, conventionally, slice relocation evaluates I/O load of each storage tier of a data storage system, and based on the evaluation optimizes overall system performance of the data storage system by moving hotter slices to a higher tier, and colder slices to a lower tier. However, in such a conventional system, slice relocation does not take into consideration physical location of logical units within a RAID group of each storage tier of the data storage system. As a result, conventionally in such a case, I/O load may be unevenly distributed across RAID groups of the storage tier, which in turns, may cause random and excessive movements of a disk arm of a disk drive of a RAID group when accessing logical units of the RAID group that may be physically located far from each other.

By contrast, in at least some implementations in accordance with the current technique as described herein, selecting slices from a logical unit of a RAID group where the logical unit is physically located closer to the center of the RAID group reduces a distance travelled by a magnetic head of a disk drive of the RAID group (also referred to as "seek distance") when the magnetic head moves across the RAID group for writing data to slices of the logical unit, thus enables the data storage system to achieve optimal or near optimal I/O performance. Further, in at least some implementations in accordance with the current technique as described herein, relocating cold data from slices of a logical unit that is located closer to the center of the RAID group to a different storage tier frees up slices of the logical unit as unused storage, which may be available for allocating slices for writing data, thereby improving overall I/O performance of the RAID group.

In at least some implementations in accordance with the current technique as described herein, the use of the selecting physical storage in data storage systems technique can provide one or more of the following advantages: lowering storage costs by improving efficiency of the data storage system, improving I/O performance by distributing I/O load optimally or nearly optimally across logical units of the RAID group, and reducing the amount of storage required in the data storage system by optimally or nearly optimally utilizing logical units of the RAID group based on location of the logical units.

In at least one implementation as described below, the current technique may be used to help provide a method of determining optimal or near optimal data placement among logical units of a RAID group based on physical location of each logical unit of the RAID group, which method helps provide a way to determine respective preferable or best storage locations of data slices within the RAID group, and if needed, to move slices from their current locations to the respective preferable or best locations within a storage pool.

Figure 1A:
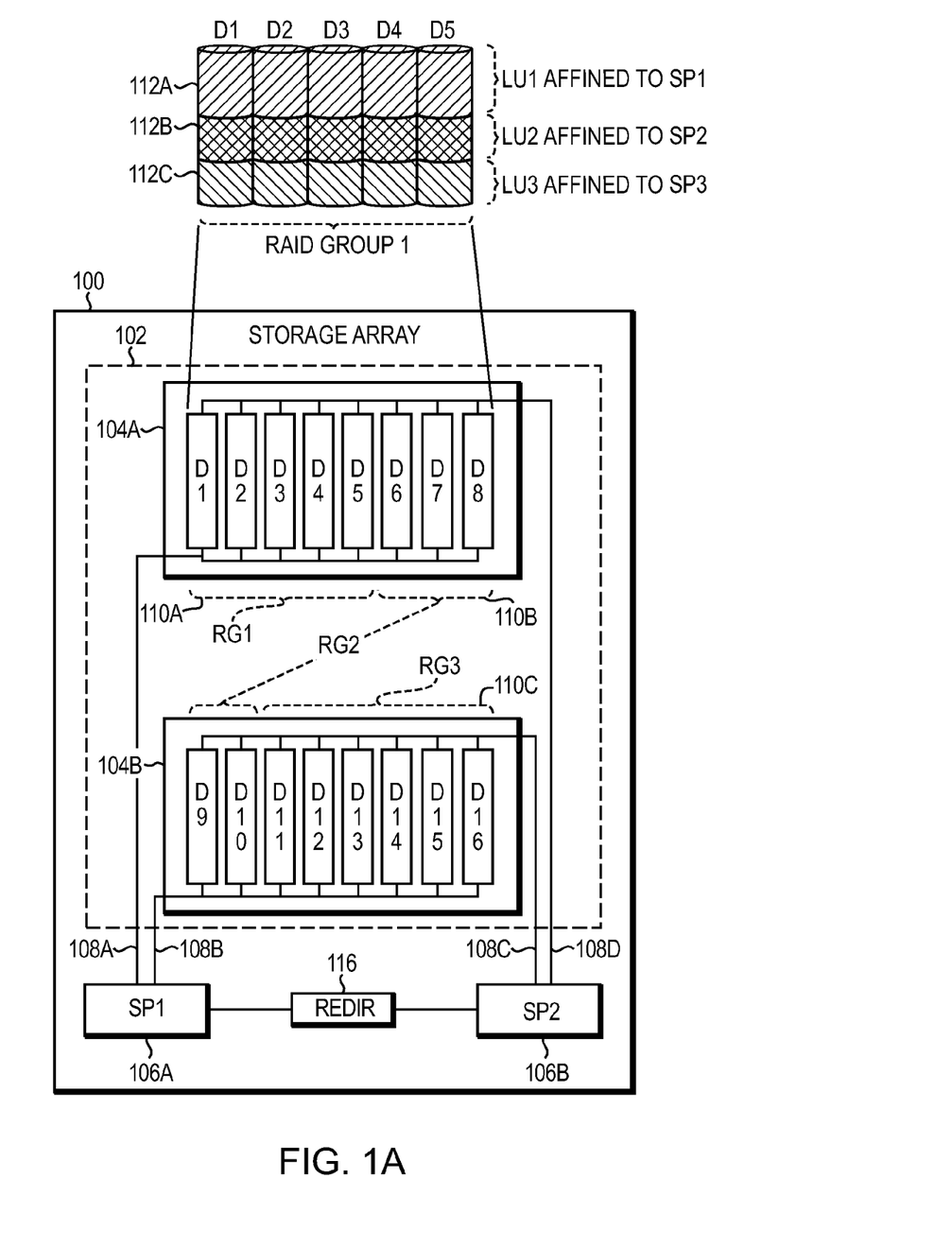
FIGS. 1A and 1B are an example of an embodiment of a computer system that may utilize the techniques described herein.

Referring now to FIG. 1A, shown is an example of an embodiment of a computer system that may be used in connection with performing the technique or techniques described herein. Data storage system 100 includes multiple storage devices 102, which are typically hard disk drives, but which may be tape drives, flash memory, flash drives, other solid state drives, or some combination of the above. In at least one embodiment, the storage devices may be organized into multiple shelves 104, each shelf containing multiple devices 102. In the embodiment illustrated in FIG. 1A, data storage system 100 includes two shelves, Shelf1 104A and Shelf2 104B; Shelf1 104A contains eight storage devices, D1-D8, and Shelf2 also contains eight storage devices, D9-D16.

Data storage system 100 may include one or more storage processors 106, for handling input/output (I/O) requests and allocations. Each storage processor 106 may communicate with storage devices 102 through one or more data buses 108. In at least one embodiment, data storage system 100 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of data storage system 100, as illustrated in FIG. 1A, is for illustrative purposes only, and is not considered a limitation of the current technique described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 1A, RG1, which includes storage devices D1-D5, is sub-divided into 3 logical units, LU1 112A, LU2 112B, and LU3 112C.

Figure 1B:
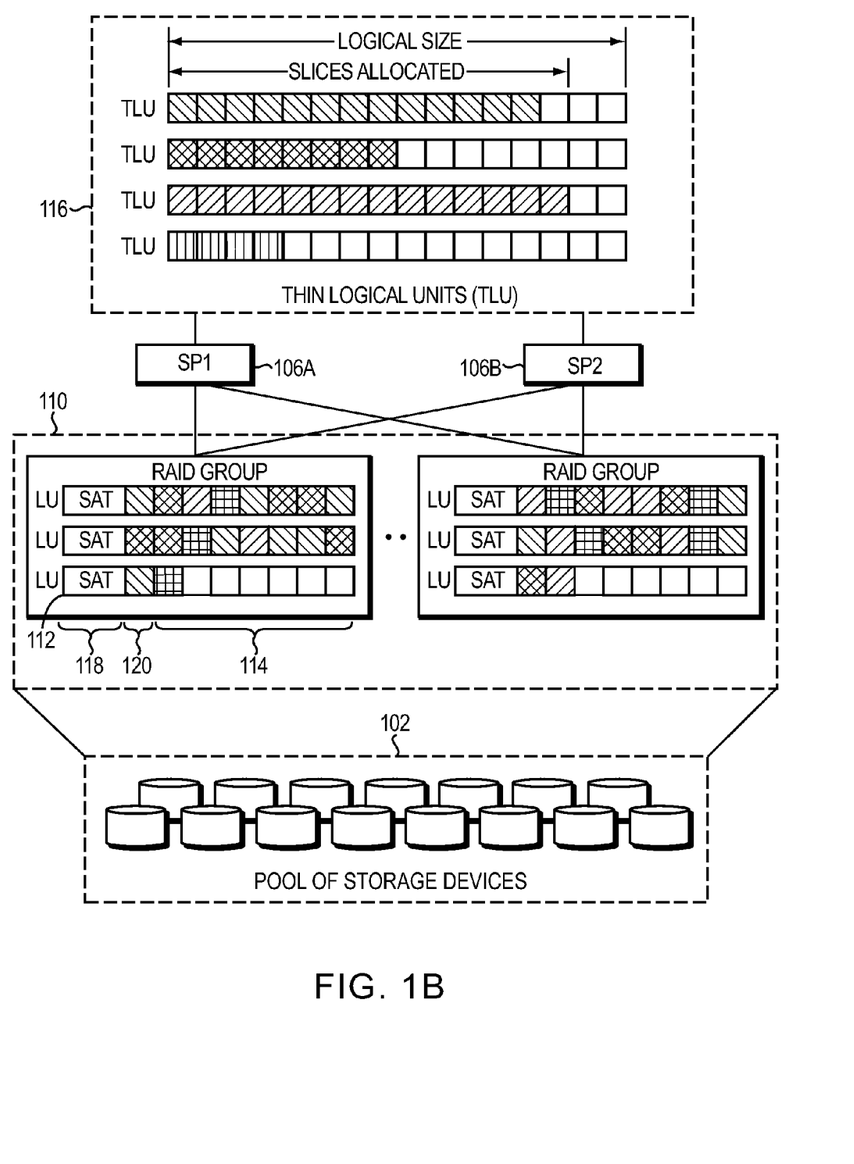

FIG. 1B is a block diagram illustrating another view of an embodiment of a computer system that may be used in connection with performing the technique or techniques described herein. In the simplified view shown in FIG. 1B, a pool of storage devices 102 are organized into multiple RAID groups 110, and each RAID group is further divided into a number of LUs from which slices 114 are allocated to one or more thin logical units (TLUs) 116. TLUs 116 may have a logical size that is larger than the actual storage size consumed by TLUs 116. The actual consumed size is determined by the number of slices actually allocated to the TLU 116. Thus, an amount of storage space presented to a host of a data storage system using a thin logical volume may be different than the amount of storage space actually allocated to the thin logical volume. The slices that are allocated to a TLU 116 may be physically located anywhere in storage array 100. As will be discussed in more detail below, these slices may be located more or less contiguously, but they may also be distributed more or less evenly across all physical resources, depending on the slice selection and allocation policy or algorithm. Other physical distributions are within the scope of the current technique claimed herein.

In at least one embodiment, storage processors 106A, 106B are responsible for allocating storage and maintaining information about how that allocated storage is being used. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

In at least one embodiment, in order to avoid contention between two or more storage processors 106A, 106B attempting to modify a particular SAT 118, each SAT 118 is controlled by only one storage processor 106. The storage processor 106 that has been given ownership of a particular SAT 118 is hereinafter referred to as the "claiming SP" for that SAT 118. Since the SAT 118 for a logical unit 112 contains information about slices within that logical unit 112, the claiming SP of a SAT 118 may be said to be the claiming SP of the logical unit, also. The remaining storage processors 106 that are not the claiming SP for a logical unit 112 are hereinafter referred to as the "peer SP". Thus, every logical unit 112 may have one claiming SP and one or more peer SPs. Since the claiming SP may be determined for each logical unit 112 individually, logical units within the same RAID group 110 may have different claiming SPs.

As used herein, the term "affining" refers to the process of associating a logical unit 112 to a storage processor 106, which then becomes the claiming SP of that logical unit 112. The term "affinity" refers to a characteristic of a logical unit 112, the characteristic indicating the association of that logical unit 112 to a particular storage processor 106. A logical unit 112 is said to have an affinity for or toward a specific storage processor 106.

In at least one embodiment, if one storage processor 106 receives an I/O request for a slice that resides within a logical unit 112 that has been affined to another storage processor 106, that I/O request may be denied, since the first storage processor does not have access to the slice allocation table for the logical unit 112 in question. In an alternative embodiment, a request for I/O access to a particular logical unit 112 may be redirected from peer SP that received the request to the claiming SP via a redirector 116. However, redirection incurs a performance penalty due to the time taken to detect the improper request, identify the appropriate storage processor, and redirect the request to the identified storage processor.

Similarly, in at least one embodiment, a peer SP may not be permitted to have allocated to it slices from a logical unit 112 claimed by another SP. For example, referring to FIG. 1A, SP1 106A may not be allowed to have slices from LU2 112, since that LU has been affined to SP2 106B. In this scenario, the slices on LU2 112 are said to be "orphaned" with respect to any peer SP, which in this example is any storage processor 106 other than SP2 106B. Thus, the slices on LU2 112 are orphaned with respect to SP1 106A. In an alternative embodiment, however, allocation of slices to a peer SP may be allowed, in a process hereinafter referred to as "poaching". However, like the I/O example above, poaching also incurs a redirection penalty.

Whether or not a slice may be allocated to a peer SP depends on the policy chosen by the user of the array, and what weight, if any, that policy gives to affinity. A policy may absolutely prohibit poaching, for example, or it may allow poaching only as a last resort, e.g., when there are no other slices available in the LUs that have been affined to the requesting SP. Alternatively, the policy may not consider affinity at all during its selection and allocation of slices. In embodiments where poaching is allowed, the SAT 118 may include information for each slice which identifies the poaching SP, i.e., storage processor 106 to which the slice has been allocated. Thus, in some embodiments, both the logical unit 112 and the slice may have affinity information associated with it.

Unlike a more traditional "fat" or fully allocated logical unit (FLU), which is created by provisioning and allocating a certain amount of storage area, a TLU is provisioned at creation but is not allocated any physical storage until the storage is actually needed. For example, physical storage space may be allocated to the TLU upon receipt of an I/O write request from a requesting entity, referred to herein as a "host". Upon receipt of the write request from the host, the SP may then determine whether there is enough space already allocated to the TLU to store the data being written, and if not, allocate to the TLU additional storage space.

In at least one embodiment of the current technique, a logical unit 112 may include a "fat" or fully allocated logical unit (FLU). A fully allocated logical unit (FLU) is a logical subset of a RAID group. Also, a fully allocated logical unit (FLU) is a logical unit managed by an operating system executing on a storage processor of a storage array.

Figure 2:
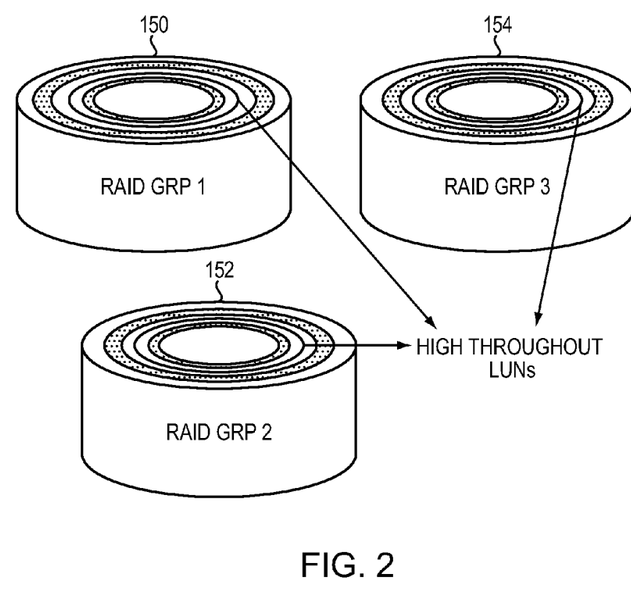
FIG. 2 is an example illustrating storage device layout.

Referring to FIG. 2, shown is an example representing how logical units of a RAID group may be accessed for writing data on a physical storage in a data storage system. For example, as shown in FIG. 2, RAID group-1 150 may include two logical units that store most of the data accessed by a storage array. For example, in such a case, one of the two logical units may be physically located at the beginning of the RAID group-1 150 and the second logical unit may be physically located at the end of the RAID group-1 150. Thus, a head of a disk drive of the RAID group-1 150 moves from the outermost edge at one end of the RAID group-1 150 to the other outermost edge at the opposing end of the RAID group-150 to access the two logical units of the RAID group-1 150. As a result of the movement of the head of the disk drive, latency of the disk drive increases, thereby increasing response times for reading data from and writing data to the two logical units.

In another example, as shown in FIG. 2, RAID group-2 152 may include two logical units that store most of the data accessed by a storage array. For example, in such a case, the two logical units may be physically located adjacent to each other. Further, for example, the two logical units may be located at the beginning of the RAID group-2 152. If logical units accessed by a head of a disk drive are located closer to each other, a distance traveled by the head of the disk drive reduces when the head moves from one logical unit to another. Thus, a seek distance traveled by a head of a disk drive of the RAID group-2 152 results into optimal or nearly optimal seek time when the head of the disk drive moves across the two logical units of the RAID group-2 152. However, when the head of the disk drive access other logical units of the RAID group-2 152 that may be located farther away from the two most accessed logical units, a distance traveled by the head of the disk drive increases when the head moves from the two most assessed logical units of the RAID group-2 152 to the other logical units of RAID group-2 152.

In at least one embodiment of the current technique, for example, RAID group-3 154 may include two logical units that store most of the data accessed by a storage array. For example, in such a case, the two logical units may be physically located adjacent to each other. Further, for example, the two logical units may be located at the center of the RAID group-3 154. Thus, a seek distance traveled by a head of a disk drive of the RAID group-3 154 results into optimal or nearly optimal seek time when the head of the disk drive moves across the two logical units of the RAID group-3 154. Additionally, when the head of the disk drive access other logical units of the RAID group-3 154 that may be physically located at the outermost edges of the RAID group-3 154, a distance traveled by the head of the disk drive reduces when the head of the disk drive move from the two most assessed logical units of the RAID group-3 154 to the other logical units.

Figure 3:
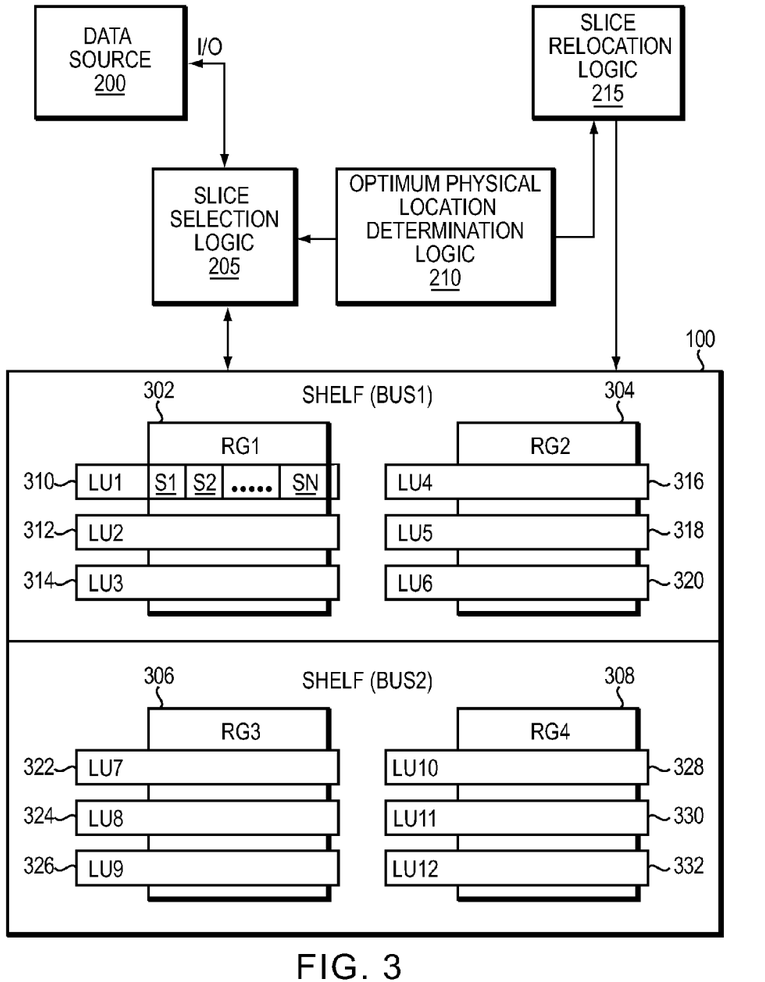
FIG. 3 is a block diagram illustrating in more detail components that may be used in connection with techniques herein.

Referring to FIG. 3, shown is a detailed representation of components that may be included in an embodiment using the techniques described herein. In at least one embodiment of the current technique, data storage system 100 includes storage devices that have been logically organized into four RAID groups, RG1 302, RG2 304, RG3 306, and RG4 308, each of which has been further subdivided into three logical units each. The RAID groups are distributed across two shelves, each with its own bus. For clarity, the buses are not shown. RG1 302 has been divided into logical units LU1 310, LU2 312, and LU3 314; RG2 304 includes LU4 316, LU5 318, and LU6 320; RG3 306 includes LU7 322, LU8 324, and LU9 326; and RG4 308 includes LU10 328, LU11 330, and LU12 332.

Each logical unit LU1 310 through LU12 332 may be divided into slices. In the example embodiment illustrated in FIG. 3, LU1 310 has been divided into slices S1 through SN. The slices may all be the same size. Alternatively, the size of the slices may vary from RAID group to RAID group, from logical unit to logical unit, or even within one logical unit.

In at least one embodiment of the current technique, a requesting entity such as data source 200 sends an I/O request that may result into a request for allocating a slice. Slice selection logic 205 determines a logical unit within a RAID group in a storage pool from which to allocate a slice. Slice selection logic 205 uses a selection algorithm that may be tailored to implement certain goals or policies. For example, a "green" policy may be designed to lower the energy or power consumption of the storage array by reducing the number of disk drives that are accessed in RAID groups, while a "brown" policy may be designed to maximize performance at the price of increased power consumption. Once a RAID identified is identified based a policy, optimum physical location determination logic 210 determines an optimum value based on which a logical unit within the identified RAID group is selected. A logical unit of the identified RAID group is selected for allocating a slice in such a way that the logical unit is physically located closest to the optimum value. The slice is allocated and provided to data source 200. If all slices of the logical unit that is located closest to the optimum value are fully allocated, a logical unit adjacent to the fully allocated logical unit is selected for allocating a slice in order to reduce the seek distance for a disk drive of the identified RAID group. In at least one embodiment of the current technique, for example, the optimum value may be an average value of identification numbers of logical units associated with the identified RAID group, which in turns may result into selecting a logical unit that is physically located closer to the center of the identified RAID group. An identification number of a logical unit of a RAID group indicates the position of the logical unit within the RAID group. It should be noted that any of the different methods may be used to compute an optimum value that may reduce the seek distance for a disk drive of an indentified RAID group.

Additionally, in at least one embodiment of the current technique, slice relocation logic 215 moves cold data stored in slices associated to logical units that are physically located closest to the optimum value to a different storage tier in order to free up storage space in the logical units.

Figure 4:
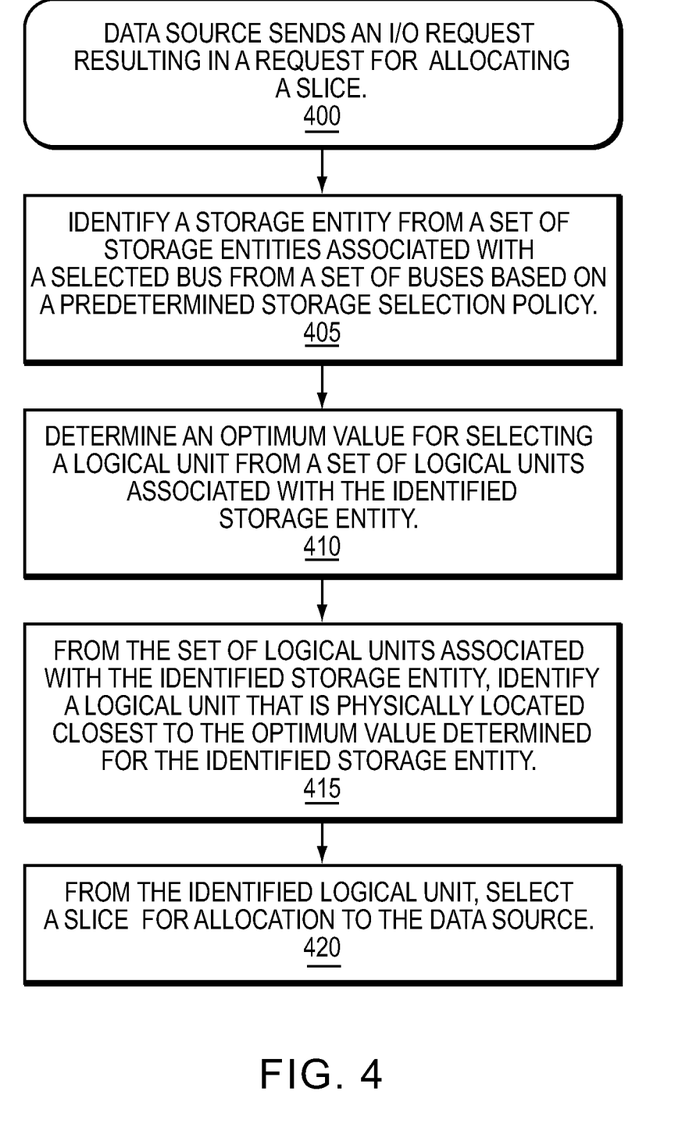
FIG. 4 is a flow diagram illustrating processes that may be used in connection with techniques herein.

Referring to FIG. 4, shown is a flow diagram illustrating selecting a physical storage in a data storage system. With reference also to FIG. 3, data source 200 sends an I/O request that may result into a request for allocation of a slice from a logical unit (step 400). A data bus is selected from a set of data buses in a data storage system based on a predetermined storage selection policy. A storage entity (e,g., a RAID group) is selected from a set of storage entities associated with the selected data bus (step 405). An optimum value for selecting a logical unit from a set of logical units associated with the identified storage entity is determined (step 410). A logical unit that is physically located closest to the optimum value within the identified storage entity is selected (step 415). From the identified logical unit, a slice is selected for allocation and provided to data source 200 for performing an I/O operation on the slice (step 420). If data source 200 needs additional slices during subsequent I/O requests, the additional slices are allocated from the identified logical unit. When all slices of the identified logical unit are allocated, a logical unit that is physically located adjacent to the identified logical unit is selected for allocating the additional slices. Subsequently, additional logical units are selected in such a way that the additional logical units are located adjacent to each other and closest to the optimum value. As a result, a distance traveled by a head of a disk drive of the identified storage entity is reduced because logical units selected for allocating slices are physically located adjacent to each other and closer to the center of the identified storage entity.

Figure 5A:
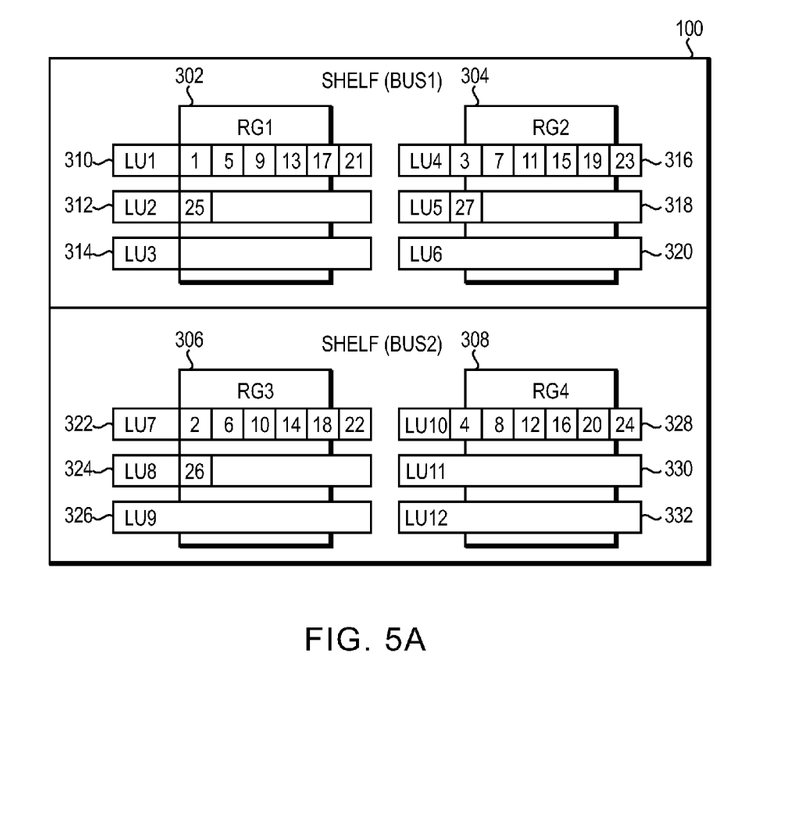
FIGS. 5A and 5B are simplified block diagrams of an exemplary system for selecting physical storage in a data storage system according to an embodiment of the techniques described herein.

Referring to FIG. 5A, shown is a block diagram illustrating an exemplary selection algorithm that implements a high-performance, or brown, policy according to an embodiment using the techniques described herein. In at least one embodiment, slices are selected and allocated so as to distribute the operating load more or less equally among all physical resources, including buses, RAID groups, logical units and storage devices, thus maximizing performance.

The bus to which the fewest allocated slices have been associated is identified. Referring to the portion of storage array 100 that is shown in FIG. 5A, 14 slices have been allocated from devices associated with shelf1 and thus associated with bus1 (i.e., slices 1, 3, 5, 7, 9, 11, 13, 15, 17, 19, 21, 23, and 27), while only 13 slices have been allocated from devices associated with shelf2/bus2 (i.e., slices 2, 4, 6, 8, 10, 12, 14, 16, 18, 20, 22, and 24). Therefore, bus2 is identified as the bus with the fewest allocated slices.

From among the RAID groups associated with the identified bus, the RAID group from which the fewest number of slices have been allocated, and which contains at least one unallocated slice, is identified. For example, RAID groups RG3 306 and RG4 308 are associated with bus2; 7 slices (2, 6, 10, 14, 18, 22, and 26) have been allocated from RG3 306 while only 6 slices (4, 8, 12, 16, 20, and 24) have been allocated from RG4 308. Therefore, RG4 308 is identified as the RAID group with the fewest allocated slices.

In at least one embodiment, if a RAID group spans multiple buses, only the slices residing within storage devices 102 that physically exist on that bus are counted. Alternatively, the number of slices attributed to each bus will be equal to the total number of slices allocated within the RAID group multiplied by the ratio of storage devices on each bus over the total number of storage device in the RAID group. For example, referring back to FIG. 1A, RG2 110B is comprised of three storage devices on bus 1 (e.g., 108A) and two storage devices on bus 2 (e.g., 108B). If 100 slices have been allocated from RG2 110B, for example, 60 slices will be attributed to bus 1 (100×⅗=60) and 40 slices will be attributed to bus 2 (100×⅖=40).

An optimum value for the identified RAID group is determined. In at least one embodiment of the current technique, for example, the identified RAID group RG4 308 includes logical units LU10 328, LU11 330, and LU12 332; The optimum value for the identified RAID group RG4 308 is computed as 11 because 11 indicates an average value of identification numbers (e.g., 10, 11, and 12) of logical units LU10 328, LU11 330, and LU12 332. Thus a logical unit within the identified RAID group is selected in such a way that the logical unit is physically located closest to the optimum value. Thus, for example, LU11 330 may be the logical unit from which a slice is allocated. If all slices of the logical unit that is physically located closest to the optimum value are fully allocated and the logical unit does not include any unallocated slices, a logical unit that is physically located adjacent to the fully allocated logical unit is selected for allocating a slice. It should be noted that other parameters or a set of criteria may be used to select a logical unit when a logical unit located closest to the optimum value is fully allocated.

A logical unit is a collection of logically contiguous sectors, which are usually physically contiguous sectors, tracks, and cylinders. Thus, a distance traveled by a head of a disk drive is reduced when slices within one logical unit are accessed during I/O operations. Additionally, accessing slices within one logical unit reduces an arm swing for a disk arm of the disk drive. By contrast, a distance traveled by the head of the disk drive is increased when I/O operations are performed on slices of two different logical units. Additionally, accessing slices across two different logical units increases an arm swing for the disk arm of the disk drive. Further, the arm swing may cause significant delay to the I/O access time. Thus, reducing the arm swing may improve I/O performance in a data storage system. Thus, in at least one embodiment of the current technique, allocating all slices from one logical unit before allocating a slice from another logical unit of the RAID group reduces the distance traveled by a head of a disk drive and an arm swing of the disk drive which in turns improves I/O performance. However, it should be noted that alternative algorithms for selecting slices that also consider the underlying physical and temporal constraints of the storage array are also within the scope of the current technique described herein. For example, it is conceivable that hard disk drives may have two independent sets of read/write arms, in which case the algorithm may begin allocating slices from two logical units within a RAID group in parallel, rather than allocating all slices from one logical unit before starting to allocate slices from a second logical unit.

A slice is selected from the identified LU, and, the selected slice is allocated to the requested entity. In at least one embodiment, the allocation of the slice may be deferred or even not performed at all. For example, an array administrator may desire to provision a certain amount of storage space in a manner that guarantees that the requested amount of space actually exists in a storage pool including fully allocated logical units. This has particular consequences with regard to TLUs, which by definition do not actually allocate slices of storage until the host actually starts writing data to the array, since allocation of the entire requested but as-yet-unused storage space would make that space unavailable for use by anyone else—thus defeating the purpose and advantages of using thin LUs. To satisfy the conflicting needs of the host (guaranteed actual space) and the thin LU (deferring allocation until actual use), the subject matter of the current technique described herein includes the concept of "reservation", in which slices are affined to the storage processor that is handling the provisioning request from the host but the slices are not yet allocated to the TLU. Reservation guarantees that a TLU will have enough physical storage space, e.g., from the FLU pool, if needed, but the storage processor has the flexibility to defer a decision about which slices in particular will be allocated to the TLU.

In at least one embodiment, upon receipt of a request for guaranteed storage space, storage processor 106 may first determine whether there are enough unallocated slices available within the logical units 112 that have been affined to it, and if not, attempt to affine additional logical units 112 as necessary. Once there is a sufficient number of unallocated slices available to storage processor 106, it will allocate slices only as needed while ensuring that it has enough affined but unallocated slices to provide the total amount provisioned if necessary.

In at least one embodiment, each slice may be affined to a particular storage processor. In these embodiments, the user policy regarding affinity may inform and affect the selection process. For example, in a policy that absolutely prohibits poaching, those logical units that are not affined to the storage processor which received the allocation request may be excluded from consideration by the selection process. This may result in identification of a completely different bus, storage entity, or logical unit from which to allocate a slice than would have been identified under a policy which allows poaching.

Figure 5B:
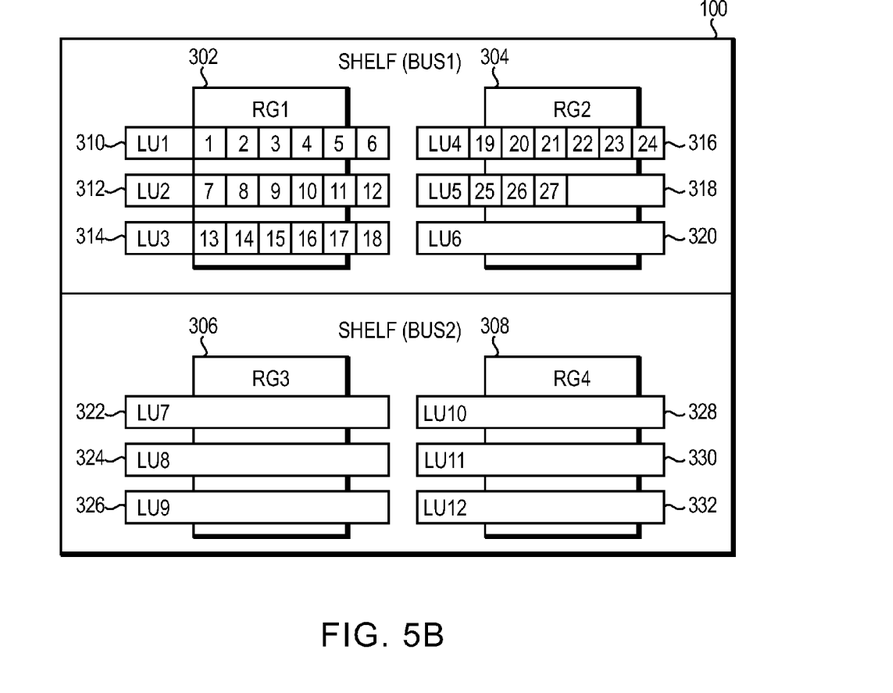

Referring to FIG. 5B, shown is a block diagram illustrating an exemplary selection algorithm that implements a low-power, or green, policy according to an embodiment of the current technique described herein. In at least one embodiment, slices are allocated in a manner so as to minimize the number of resources that will be active at any one time.

In response to receiving a request for allocation, the bus to which the most allocated slices have been associated, and which contains at least one unallocated slice, is identified. Referring to the portion of data storage system 100 that is shown in FIG. 5B, only bus1 includes storage devices from which slices have been allocated, and there are unallocated slices still available on bus1. Thus, bus1 is identified as a bus to which allocated slices have been associated.

From the storage entities, which in this example are RAID groups, associated with the identified bus, a RAID group from which the most slices have been allocated, and which contains at least one unallocated slice, is identified. In FIG. 5B, RG1 302 is the storage entity from which the most slices have been allocated, but RG1 302 does not contain any unallocated slices. RG2 304 is the storage entity from which the next largest number of slices has been allocated, and RG2 304 does include at least one unallocated slice. Thus, RG2 304 is identified as a RAID group including a logical unit from which a slice has been allocated and which includes at least one unallocated slice.

The identified RAID group RG2 304 includes logical units LU4 316, LU5 318, and LU6 320. In at least one embodiment of the current technique, the optimum value for the identified RAID group RG2 304 is computed as 5 because 5 indicates an average value of identification numbers (e.g., 4, 5, and 6) for logical units LU4 316, LU5 318, LU6 320. Thus a logical unit of the identified RAID group is selected in such a way that the logical unit is physically located closest to the optimum value. Thus, for example, LU5 318 may be the logical unit from which a slice is allocated. If all slices of the logical unit that is physically located closest to the optimum value are fully allocated and the logical unit does not include any unallocated slice, a logical unit that is physically located adjacent to the fully allocated logical unit is selected for allocating a slice.

A slice is a selected from the identified LU for allocation to the requesting entity. Unless the slice is to be reserved rather than allocated, the selected slice is allocated to the requesting entity.

The green and brown policies described above in FIGS. 5A and 5B, respectively, are only two examples of possible policies and their associated algorithms. Other policies, and variations on the green and brown policies, are within the scope of the current technique described herein. For example, a storage array administrator may, by setting a "RAID group fill threshold", create a policy that is somewhere in between green and brown. If the RG fill threshold is set to 100%, meaning that one RG must be 100% allocated before another RG may be tapped for allocation of slices to a TLU, this looks like a green policy, since it tends to minimize the number of devices that are active at any one time. On the other hand, setting the RAID group fill threshold to 0% causes the allocation algorithm to act like a brown policy, allocating in parallel from as many RAID groups as are available. By adjusting this and a variety of other parameters, a storage array administrator may find the desired balance between performance and power consumption, for example, or otherwise tune the operation of the storage array.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in selecting physical storage in data storage systems, the method comprising:
   receiving, from a requesting entity, a request for allocation of a portion of storage area of a data storage system, the data storage system comprising a set of storage entities and a set of data buses for transferring data to and from the set of storage entities, wherein the set of storage entities are organized into a set of logical units, and wherein each logical unit of the set of logical units is subdivided into a set of slices; and
   in response to receiving the request for allocation, selecting a slice from a logical unit of the set of logical units for allocation for use by the requesting entity, wherein the selection is based on an optimum value indicating physical location of the logical unit within the set of storage entities during access to data to be stored in the data storage system, wherein the optimum value is an average value of identification numbers associated with logical units associated with a storage entity, wherein the optimum value indicates a physical location at the center of the storage entity.

2. The method of claim 1, wherein selecting the slice further comprising:
   identifying a data bus from the set of data buses based on a storage policy and a number of allocated slices associated with each data bus of the set of data buses;
   identifying a storage entity from a set of storage entities associated with the identified data bus based on the storage policy and a number of slices allocated from each storage entity of the set of storage entities;
   identifying a logical unit from a set of logical units associated with the identified storage entity based on optimum value indicating physical location of the logical unit within the identified storage entity; and
   selecting a slice from the identified logical unit for allocation to the requesting entity.

3. The method of claim 1, further comprising allocating the selected slice to the requesting entity.

4. The method of claim 1, wherein each storage entity of the set of storage entities comprises one of a single storage device and a plurality of storage devices organized into a redundant array and wherein each storage device comprises one of a hard disk drive, a floppy disk drive, a tape drive, a solid state drive, a flash memory, and a flash drive.

5. The method of claim 4, wherein the redundant array comprises a redundant array of inexpensive disks (RAID) group, a RAID group having a first disk drive and a second disk drive.

6. The method of claim 1, wherein a logical unit of a storage entity is associated with an identification number indicating a position of the logical unit within the storage entity.

7. The method of claim 1, wherein each slice of the set of slices is associated with a data bus of the set of data buses.

8. The method of claim 1, wherein each storage entities of the set of storage entities is connected to at least two data buses of the set of data buses.

9. A system for use in selecting physical storage in data storage systems, the system comprising:
   a processor;
   first logic receiving, from a requesting entity, a request for allocation of a portion of storage area of a data storage system, the data storage system comprising a set of storage entities and a set of data buses for transferring data to and from the set of storage entities, wherein the set of storage entities are organized into a set of logical units, and wherein each logical unit of the set of logical units is subdivided into a set of slices; and
   second logic selecting, in response to receiving the request for allocation, a slice from a logical unit of the set of logical units for allocation for use by the requesting entity, wherein the selection is based on an optimum value indicating physical location of the logical unit within the set of storage entities during access to data to be stored in the data storage system, wherein the optimum value is an average value of identification numbers associated with logical units associated with a storage entity, wherein the optimum value indicates a physical location at the center of the storage entity.

10. The system of claim 9, wherein selecting the slice further comprising:
    third logic identifying a data bus from the set of data buses based on a storage policy and a number of allocated slices associated with each data bus of the set of data buses;
    fourth logic identifying a storage entity from a set of storage entities associated with the identified data bus based on the storage policy and a number of slices allocated from each storage entity of the set of storage entities;
    fifth logic identifying a logical unit from a set of logical units associated with the identified storage entity based on optimum value indicating physical location of the logical unit within the identified storage entity; and
    sixth logic selecting a slice from the identified logical unit for allocation to the requesting entity.

11. The system of claim 9, further comprising allocating the selected slice to the requesting entity.

12. The system of claim 9, wherein each storage entity of the set of storage entities comprises one of a single storage device and a plurality of storage devices organized into a redundant array and wherein each storage device comprises one of a hard disk drive, a floppy disk drive, a tape drive, a solid state drive, a flash memory, and a flash drive.

13. The system of claim 12, wherein the redundant array comprises a redundant array of inexpensive disks (RAID) group, a RAID group having a first disk drive and a second disk drive.

14. The system of claim 9, wherein a logical unit of a storage entity is associated with an identification number indicating a position of the logical unit within the storage entity.

15. The system of claim 9, wherein each slice of the set of slices is associated with a data bus of the set of data buses.

16. The system of claim 9, wherein each storage entities of the set of storage entities is connected to at least two data buses of the set of data buses.

\* \* \* \* \*